No. 652,556. Patented June 26, 1900.
J. A. GAVITT.
SNAP HOOK.
(Application filed Dec. 5, 1899.)
(No Model.)
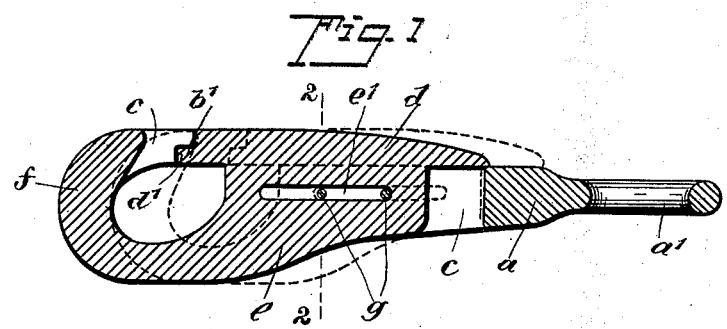
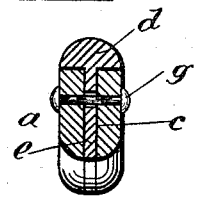
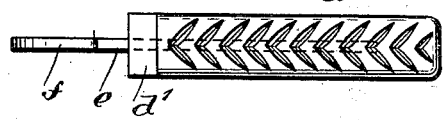
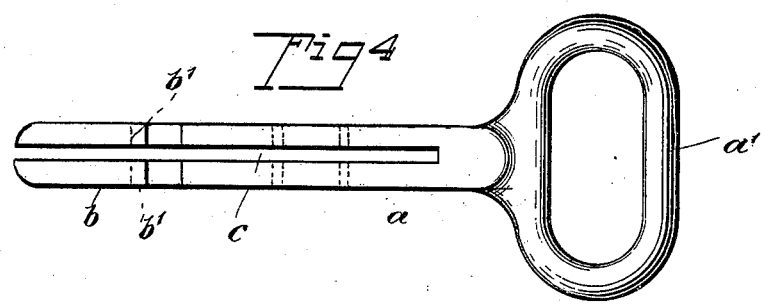
WITNESSES:
J. A. Brophy
J. B. Owens
INVENTOR
James A. Gavitt
BY
ATTORNEYS.

UNITED STATES PATENT OFFICE.

JAMES ALEXANDER GAVITT, OF WAITSBURG, WASHINGTON, ASSIGNOR OF ONE-HALF TO CHARLES WESLEY AND FRED McCOY, OF SAME PLACE.

SNAP-HOOK.

SPECIFICATION forming part of Letters Patent No. 652,556, dated June 26, 1900.

Application filed December 5, 1899. Serial No. 739,285. (No model.)

*To all whom it may concern:*

Be it known that I, JAMES ALEXANDER GAVITT, a citizen of the United States, and a resident of Waitsburg, in the county of Walla Walla and State of Washington, have invented a new and Improved Snap-Hook, of which the following is a full, clear, and exact description.

This invention relates to a snap-hook adapted especially for use in harness, the object being to provide a snap-hook without springs which will be more certain of action and more easily operated than other devices of its class.

This specification is the disclosure of one form of my invention, while the claim defines the actual scope thereof.

Reference is to be had to the accompanying drawings, forming a part of this specification, in which similar characters of reference indicate corresponding parts in all the views.

Figure 1 is a longitudinal section of the invention, showing the hook closed and illustrating by dotted lines the position of the parts when open. Fig. 2 is a section on the line 2 2 of Fig. 1. Fig. 3 is a plan view of the keeper detached, and Fig. 4 is a plan view of the main portion or hook proper of the device with the cover removed.

The main portion or hook proper comprises a shank $a$ and a hook $b$. If desired, the shank may be provided with an eye $a'$ or any other device for attaching the snap-hook to the harness. The body of the device is split longitudinally, as shown best in Fig. 4, forming an open space or slot $c$, extending through the hook proper, $b$, and into the shank $a$. This forms the hook $b$ into two like parts or cheek-pieces, and the bills or points of these cheek-pieces are formed on their under sides with notches $b$, as best shown in Fig. 1.

The keeper comprises a thumb-plate $d$, mounted to slide on the upper side of the shank $a$, which is made plane to match with the plane under face of the thumb-plate. The thumb-plate is provided at its front end with a forwardly-projecting lip $d'$, which is adapted to project into the recesses $b'$ of the hook $b$ when the keeper is in closed position, as shown in Fig. 1. The keeper has a centrally and longitudinally disposed web $e$, which is mounted to slide in the slot $c$, the web being integral with the thumb-plate, and this web has a front extension forming a hook $f$, which lies between the cheek-pieces of the hook $b$ and is movable from the position shown by full lines in Fig. 1 rearwardly to the position shown by dotted lines, in which latter position the bill or point of the hook $f$ will lie in transverse alinement with the bills or points of the cheek-pieces of the hook $b$. The keeper is held in place by one or more pins $g$, which are fastened in the shank $a$ and extend across the slot $c$, the web $e$ having a longitudinally-disposed slot $e$, in which the pins $g$ are received, as shown, thus permitting the necessary movement of the keeper, but preventing the displacement of the same.

In using the hook to engage with an eye, strap, or the like the keeper is moved to the position indicated by dotted lines in Fig. 1, and the part with which the device is to be engaged is dropped into the hook $f$ of the keeper below the bills or points of the hook $b$. Strain is then placed on the snap-hook, and the keeper is caused to move to the position shown in Fig. 1, in which the hook $f$ will essentially coincide with the hook $b$, and the forward end of the thumb-plate $d$ will be engaged with the bills of the hook $b$, thus preventing the disengagement of the snap-hook from the part with which it is connected. The keeper being friction-tight on the body of the snap-hook, it will be seen that there is no possibility of the keeper moving accidentally to open position, and, further, the strain on the device will, through the engagement of the hook $f$ with the part to which the snap-hook is fastened, cause the keeper always to remain in closed position. The top of the thumb-plate $d$ is milled or scored to furnish an effective hold thereon, and to open the hook it is only necessary to push the thumb-plate $d$ backward, thus moving the parts to the position shown by dotted lines in Fig. 1 and permitting the disengagement of the ring on the snap-hook.

Having thus described my invention, I claim as new and desire to secure by Letters Patent—

A snap-hook, having a main portion and a keeper, the top face of which main portion is plane, and the main portion having a hook projected from the shank, the main portion also having a longitudinally-disposed slot therein lying in the plane of the hook and extending into and through the shank, and the keeper comprising a thumb-plate with a plane under face lying snugly on the top face of the shank, and of a width equal to the thickness of the shank, the front end of the thumb-plate being projected in position to engage with the point or bill of the hook, whereby to close the hook, and the keeper also comprising a longitudinally-disposed web projecting from the under face of the thumb-plate and lying friction-tight in the slot of the main portion, the web having a front extension forming a hook and lying adjacent to the hook of the main portion, and a pin or pins extended transversely through the shank and through a slot in the web, whereby to slidably mount the keeper.

In testimony whereof I have signed my name to this specification in the presence of two subscribing witnesses.

JAMES ALEXANDER GAVITT.

Witnesses:
W. H. FLETCHER,
D. V. WOOD.